(12) United States Patent
Ju et al.

(10) Patent No.: US 10,654,954 B2
(45) Date of Patent: May 19, 2020

(54) METHOD OF PREPARING VINYL CHLORIDE-BASED POLYMER

(71) Applicant: LG CHEM, LTD., Seoul (KR)

(72) Inventors: Jin Hyuck Ju, Daejeon (KR); Hyun Kyou Ha, Daejeon (KR); Joong Chul Lim, Daejeon (KR); Yang Jun Jeon, Daejeon (KR); Min Jeong Kang, Daejeon (KR)

(73) Assignee: LG CHEM LTD., Seoul (KR)

( * ) Notice: Subject to any disclaimer, the term of this patent is extended or adjusted under 35 U.S.C. 154(b) by 19 days.

(21) Appl. No.: 15/763,726

(22) PCT Filed: Jun. 7, 2017

(86) PCT No.: PCT/KR2017/005911
§ 371 (c)(1),
(2) Date: Mar. 27, 2018

(87) PCT Pub. No.: WO2017/222213
PCT Pub. Date: Dec. 28, 2017

(65) Prior Publication Data
US 2018/0282447 A1    Oct. 4, 2018

(30) Foreign Application Priority Data

Jun. 21, 2016 (KR) .......... 10-2016-0077236
May 29, 2017 (KR) .......... 10-2017-0066099

(51) Int. Cl.
| | | |
|---|---|---|
| C08F 14/06 | (2006.01) |
| C08F 114/06 | (2006.01) |
| C08F 2/38 | (2006.01) |
| C08L 27/06 | (2006.01) |

(52) U.S. Cl.
CPC .............. *C08F 114/06* (2013.01); *C08F 2/38* (2013.01); *C08F 14/06* (2013.01); *C08L 27/06* (2013.01); *C08L 2205/025* (2013.01); *C08L 2205/03* (2013.01)

(58) Field of Classification Search
CPC .......... C08F 14/06; C08F 114/06; C08F 2/22; C08F 2/24; C08F 2/30; C08F 2/38
See application file for complete search history.

(56) References Cited

U.S. PATENT DOCUMENTS

| | | | | |
|---|---|---|---|---|
| 3,260,711 A | | 7/1966 | Christen et al. | |
| 3,457,241 A | * | 7/1969 | Iko | C08F 14/06 526/193 |
| 3,929,753 A | * | 12/1975 | Itoh | C08F 14/06 526/202 |
| 4,031,299 A | * | 6/1977 | Wei | C08F 14/06 526/193 |
| 4,143,224 A | * | 3/1979 | Klippert | C08F 14/06 526/200 |
| 4,189,415 A | * | 2/1980 | Eck | C08F 214/06 524/407 |
| 4,258,165 A | * | 3/1981 | Emura | C08F 214/06 526/263 |
| 4,345,056 A | * | 8/1982 | Thyret | C08F 14/06 526/200 |
| 4,464,517 A | * | 8/1984 | Makino | B01J 19/2465 422/138 |
| 4,526,946 A | * | 7/1985 | Fitzpatrick | C08F 14/06 526/200 |
| 5,308,911 A | * | 5/1994 | Takada | C08F 2/20 524/503 |
| 6,455,646 B1 | * | 9/2002 | Usuki | C08F 14/06 526/93 |
| 8,288,465 B2 | * | 10/2012 | Kato | C08L 27/06 524/317 |
| 9,751,963 B2 | * | 9/2017 | Fukuhara | C08F 2/20 |
| 2008/0103253 A1 | * | 5/2008 | Berna | C08F 14/06 524/803 |
| 2011/0201737 A1 | | 8/2011 | Kato et al. | |
| 2011/0319541 A1 | | 12/2011 | Nakamae et al. | |
| 2016/0289360 A1 | * | 10/2016 | Pascual Fern Ndez | C08F 14/06 |

FOREIGN PATENT DOCUMENTS

| | | | |
|---|---|---|---|
| CA | 2054865 A1 | 5/1992 |
| CN | 1213384 A | 4/1999 |
| EP | 0560264 A1 | 9/1993 |
| EP | 2348070 B1 | 7/2011 |
| JP | 2014-114380 A | 6/2014 |
| KR | 10-2007-0003828 A | 1/2007 |
| KR | 10-2011-0110222 A | 10/2011 |
| KR | 10-1199094 A | 11/2012 |
| KR | 10-2016-0047141 A | 5/2016 |

* cited by examiner

*Primary Examiner* — Rip A Lee
(74) *Attorney, Agent, or Firm* — Dentons US LLP

(57) ABSTRACT

The present invention relates to a method of preparing a vinyl chloride-based polymer, and more specifically, to a method comprising the steps of, (S1) preparing a mixture in which a first protective colloid auxiliary agent and a chain regulator are mixed; (S2) preparing a second protective colloid auxiliary agent including the chain regulator activated by stirring the mixture prepared in step (S1); and (S3) performing polymerization by adding a vinyl chloride-based monomer and a polymerization initiator in the presence of the second protective colloid auxiliary agent prepared in step (S2).

9 Claims, No Drawings

METHOD OF PREPARING VINYL CHLORIDE-BASED POLYMER

CROSS-REFERENCE TO RELATED APPLICATIONS

This application is a National Stage Entry of International Application No. PCT/KR2017/005911, filed on Jun. 7, 2017, and claims the benefit of and priority to Korean Application No. 10-2016-0077236, filed on Jun. 21, 2016, and Korean Application No. 10-2017-0066099, filed on May 29, 2017, all of which are hereby incorporated by reference in their entirety for all purposes as if fully set forth herein.

TECHNICAL FIELD

The present invention relates to a method of preparing a vinyl chloride-based polymer, and more particularly, to a method of preparing a vinyl chloride-based polymer capable of improving melt processability thereof.

BACKGROUND ART

A vinyl chloride-based polymer is a polymer containing at least 50 wt % of a repeating unit derived from a vinyl chloride monomer (VCM), and is used in a variety of applications due to being inexpensive, having an easily controlled hardness, and being applicable to most processing units. Moreover, a vinyl chloride-based polymer is widely used in various fields because it can provide molded products having excellent physical and chemical properties, such as mechanical strength, weather resistance, and chemical resistance. Particularly, a vinyl chloride-based polymer is used for a pipe, a sash and the like for hard use, and is used for wrapping vinyl, a film, a sheet and the like for soft use. In addition, a vinyl chloride-based polymer having a high degree of polymerization may be used, according to the physical properties thereof, for coating high strength and heat-proof wires and for special gaskets.

However, the vinyl chloride-based polymer having a high polymerization degree has lower melt processability than that of a hard or a soft vinyl chloride-based polymer used for general purpose products. Thus, there is a drawback that the productivity of processed molded products is deteriorated.

Thus, when processing temperature is raised to improve the melt processability, there is a problem that discoloration occurs due to the structural characteristic of the vinyl chloride-based polymer. In addition, when a plasticizer is added during processing, the process may be performed at a low temperature. However, since the plasticizer remains in a processed product and greatly affects the physical properties of the processes product, there is a limit to the amount of plasticizer to be used.

Therefore, there is a continuing need for efforts to improve melt processability of a vinyl chloride-based polymer having a high degree of polymerization in the related industry.

DISCLOSURE OF THE INVENTION

Technical Problem

The present invention has been devised to solve the above-mentioned problems of the prior art. The object of the present invention is to provide a method of preparing a vinyl chloride-based polymer, the method being capable of improving melt processability while not affecting the basic polymerization physical properties such as polymerization time and degree of polymerization by adding an activated chain regulator in the beginning of polymerization of a vinyl chloride-based polymer.

Technical Solution

According to an embodiment of the present invention to solve the problems, there is provided a method of preparing a vinyl chloride-based polymer comprising the steps of: (S1) preparing a mixture in which a first protective colloid auxiliary agent and a chain regulator are mixed; (S2) preparing a second protective colloid auxiliary agent including the chain regulator activated by stirring the mixture prepared in step (S1); and (S3) performing polymerizing by adding a vinyl chloride-based monomer and a polymerization initiator in the presence of the second protective colloid auxiliary agent prepared in step (S2), wherein the stirring in step (S2) is performed at a stirring speed of 70 rpm to 100 rpm for 10 to 40 minutes.

Advantageous Effects

According to the present invention, a chain regulator is added to a protective colloid auxiliary agent which is added in the beginning of polymerization and the chain regulator and the protective colloid auxiliary agent are stirred in advance and added in an activated state such that a vinyl chloride-based polymer having a wide particle size distribution and a side chain is prepared while not affecting the basic polymerization properties such as polymerization time and degree of polymerization. When processing the prepared vinyl chloride-based polymer, a method of preparing a vinyl chloride-based polymer having remarkably improved melt processability is provided.

MODE FOR CARRYING OUT THE INVENTION

Hereinafter, the present invention will be described in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing a vinyl chloride-based polymer of the present invention uses a characteristic of maximizing polymerization efficiency in a short time by improving the activity of a chain regulator. According to an embodiment, the method may comprise the steps of, (S1) preparing a mixture in which a first protective colloid auxiliary agent and a chain regulator are mixed; (S2) preparing a second protective colloid auxiliary agent including the chain regulator activated by stirring the mixture prepared in step (S1); and (S3) performing polymerization by adding a vinyl chloride-based monomer and a polymerization initiator in the presence of the second protective colloid auxiliary agent prepared in step (S2), wherein the stirring in step (S2) is performed at a stirring speed of 70 rpm to 100 rpm for 10 to 40 minutes.

In the present invention, polymerization may mean suspension polymerization unless defined otherwise.

The characteristic of improving the activity of a chain regulator according to the present invention is realized by stirring the chain regulator with a first protective colloid auxiliary agent. When compared with a case in which a chain regulator is separately added without being stirred with a first protective colloid auxiliary agent, it is possible to polymerize a vinyl chloride-based polymer having a high degree of polymerization, maintain the mechanical properties of the vinyl chloride-based polymer, and yet improve the melt processability thereof such that productivity is greatly improved. That is, when the chain regulator and the first protective colloid auxiliary agent are stirred in advance, the chain regulator may be activated via a chain reaction such as transesterification between an ester functional group of the chain regulator and an alcohol functional group of the first protective colloid auxiliary agent. From this, it is possible to further improve the respective effects of improving melt processability through a chain regulator and improving dispensability through a first protective colloid auxiliary agent, and to polymerize a vinyl chloride-based polymer having a high degree of polymerization. As described above, the vinyl chloride-based polymer may exhibit synergistic effects of having a high degree of polymerization and a greatly improved melt processability and productivity.

According to an embodiment of the present invention, the first protective colloid auxiliary agent may be a hydrophilic colloid used for reducing the degree of instability of an electrolyte of a vinyl chloride-based monomer which is a hydrophobic colloid. For example, the first protective colloid auxiliary agent may be a dispersion stabilizer dissolved in an aqueous phase, and specifically a water-soluble polymer.

The first protective colloid auxiliary agent of the present invention may comprise, for example, polyvinyl alcohol. As a specific example, the polyvinyl alcohol may have a number average degree of polymerization of 1,000 to 3,500, 1,100 to 3,300, or 1,200 to 3,100. As another example, the polyvinyl alcohol may be a mixture of one or more of polyvinyl alcohols having a number average degree of polymerization of 1,250 to 1,320, 1,650 to 1,750, or 2,900 to 3,100. When suspension polymerization is performed in this range, the action and effect of protective colloid are excellent, and the activation of a chain regulator is easy.

As another example, the polyvinyl alcohol may have a degree of hydration of 60 mol % to 90 mol %, 65 mol % to 89 mol %, or 72 mol % to 88 mol %. When using polyvinyl alcohol having a high degree of hydration in this range for a first protective colloid auxiliary agent serving as a first dispersant, the action and effect of the protective colloid are excellent in suspension polymerization, and the activation of a chain regulator is easy. The polyvinyl alcohol may be a mixture of two or more selected from the group consisting of polyvinyl alcohol having different degrees of hydration in the range of degree of hydration. As a specific example, the polyvinyl alcohol may be a mixture of polyvinyl alcohol having a degree of hydration of 72 mol % and polyvinyl alcohol having a degree of hydration of 88 mol % as in Example 1 of the present invention, but not limited thereto.

According to an embodiment of the present invention, the first protective colloid auxiliary agent may be used in an amount of 0.01 parts by weight to 1 part by weight, 0.02 parts by weight to 0.5 parts by weight, or 0.03 parts by weight to 0.1 parts by weight based on 100 parts by weight of the vinyl chloride-based monomer. When polymerization is performed in this range, stability of process is excellent and productivity is excellent because residual monomers can be easily recovered after the polymerization.

The chain regulator of the present invention is used for improving the degree of polymerization of a vinyl chloride-based polymer, and may be one or more selected from the group consisting of diallyl phthalate, allyl methacrylate, diallyl maleate, triallyl isocyanurate, pentaerythritol triallyl ether, ethyl glycol dimethyl acrylate, diaryl maleate (having 6 to 30 carbon atoms, or 10 to 30 carbon atoms), divinylbenzene and the like. Specifically, the chain regulator may be diallyl phthalate. In this case, it is possible to prepare a vinyl chloride-based polymer having a number average degree of polymerization of 1,000 or more, and having excellent melt processability.

According to an embodiment of the present invention, the amount of the chain regulator may be in a range of 0.01 parts by weight to 0.5 parts by weight, 0.05 parts by weight to 0.05 parts by weight, or 0.08 parts by weight to 0.2 parts by weight based on 100 parts by weight of the vinyl chloride-based monomer. When polymerization is performed in this range, it is possible to prepare a vinyl chloride-based polymer having a high degree of polymerization while not affecting the basic polymerization properties such as polymerization time and degree of polymerization, and having excellent melt processability.

According to an embodiment of the present invention, the stirring in step (S2) may be performed for 10 to 40 minutes, 15 to 30 minutes, or 10 to 20 minutes. In this range, the activity of a chain regulator in a second protective colloid auxiliary agent is remarkably improved.

According to an embodiment of the present invention, the stirring in step (S2) may be performed at a speed of 70 rpm to 100 rpm, 80 rpm to 100 rpm, or 90 rpm to 100 rpm. When stirring is performed under these conditions, the activity of a chain regulator in a second protective colloid auxiliary agent is remarkably improved.

Specifically, according to an embodiment of the present invention, the stirring in step (S2), as described above, may be performed at a stirring speed of 70 rpm to 100 rpm for 10 to 40 minutes. More specifically, the stirring may be performed at a stirring speed of 90 rpm to 100 rpm for 10 to 20 minutes.

More specifically, according to an embodiment of the present invention, the stirring in step (S2) may be performed at a stirring speed of 70 rpm for 40 minutes, at a stirring speed of 90 rpm for 20 minutes, or at a stirring speed of 100 rpm for 10 minutes.

The vinyl chloride-based monomer of the present invention may be a vinyl chloride monomer (VCM) alone, or may include all vinyl-based monomers copolymerizable with the vinyl chloride monomer. The copolymerizable vinyl-based monomer may be one or more selected from the group consisting of olefin compounds such as ethylene and propylene; vinyl esters such as vinyl acetate and vinyl propionate; unsaturated nitriles such as acrylonitrile; vinyl alkyl ethers such as vinyl methyl ether and vinyl ethyl ether; and unsaturated fatty acids such as acrylic acid, methacrylic acid, itaconic acid and maleic acid, and anhydrides of these fatty acids. When the vinyl chloride-based monomer includes a copolymerizable vinyl-based monomer, not a vinyl chloride monomer alone, an amount of a repeating unit derived from the vinyl chloride monomer (VCM) may be 50 wt % or more based on a vinyl chloride-based polymer.

The polymerization initiator of the present invention is not specifically limited as long as it may be used in polymerization of a vinyl chloride-based polymer, however, may be one or more selected from the group consisting of, for example, peroxides such as α,α'-bis(neodecanoylperoxy) diisopropylbenzene, cumene peroxyneodecanoate, di-n-propyl peroxydicarbonate, diisopropyl peroxy dicarbonate, 1,1,3,3-tetramethylbutyl peroxyneodecanoate, bis(4-t-butylcyclohexyl) peroxy dicarbonate, 1-cyclohexyl-1-methylethyl peroxyneodecanoate, di-2-ethoxyethyl peroxy dicarbonate, di-2-ethylhexyl peroxydicarbonate, t-hexyl peroxyneodecanoate, dimethoxybutyl peroxy dicarbonate, bis(3-methyl-3-methoxybutyl) peroxydicarbonate, t-butyl peroxyneodecanoate, and t-hexyl peroxypivalate; and azo compounds such as 2,2'-azobis(2,4-dimethylvaleronitrile), 2,2'-azobis(isobutyronitrile), and dimethyl 2,2'-azobis(isobutyrate).

According to an embodiment of the present invention, the polymerization initiator may be used in an amount of 0.01 parts by weight to 0.5 parts by weight, 0.05 parts by weight to 0.05 parts by weight, or 0.05 parts by weight to 0.1 parts by weight based on 100 parts by weight of the vinyl chloride-based monomer. When polymerization is performed in this range, process stability is excellent.

According to an embodiment of the present invention, the polymerization in step (S3) may be performed by further including a third protective colloid auxiliary agent. In this case, the action and effect of a protective colloid may be further improved during suspension polymerization. The third protective colloid auxiliary agent may be, for example, one or more selected from the group consisting of polyethylene glycol, starch, dextrin, a water-soluble cellulose-based compound, polyvinylpyrrolidone, polystyrol-b-polyethylene oxide-block copolymer, and a polymethacrylate-b-polyethylene oxide-block copolymer. Preferably, the third protective colloid auxiliary agent may be a water-soluble cellulose-based compound and the water-soluble cellulose-based compound may be, for example, hydroxyalkyl methylcellulose. In this case, an alkyl group may be a linear or branched alkyl group having 1 to 10 carbon atoms, or 1 to 5 carbon atoms.

According to an embodiment of the present invention, the polymerization in step (S3) may be performed at a temperature of 48° C. to 62° C., 50° C. to 60° C., or 50° C. to 58° C., and may be adjusted, for example, according to an amount of the chain regulator added in polymerization. If the amount of chain regulator is increased, polymerization temperature may be increased to perform polymerization. As a specific example, when 0.08 parts by weight of chain regulator are added as in Examples 1 to 3 of the present invention, polymerization may be performed at 54° C. When 0.1 parts by weight of chain regulator are added, polymerization may be performed at 56° C., and when 0.13 parts by weight of chain regulator are added, polymerization may be performed at 58° C., but the present invention is not limited thereto. As described above, when polymerization temperature is increased as the amount of chain regulator is increased, process stability is excellent during polymerization.

Moreover, it is desirable that the second protective colloid auxiliary agent prepared in step (S2) of the present invention, according to a method of preparing a vinyl chloride-based polymer of the present invention, is added in step (S3), that is, before the initiation of polymerization, in order to maximize the efficiency of polymerization of conversion into a polymer. When a protective colloid auxiliary agent or a separate chain regulator are additionally added in the middle of polymerization after the initiation of polymerization, unlike before the initiation of polymerization as described in the present invention, it is difficult to adjust the degree of polymerization such that a vinyl chloride-based polymer having a target high degree of polymerization may not be obtained.

A vinyl chloride-based polymer prepared according to an embodiment of the present invention may include a chain regulator-derived functional group, have a number average degree of polymerization of 1,300 to 3,000, have an average particle diameter of 100 μm to 200 μm, and have a particle size distribution of 1.8 to 2.5.

The number average degree of polymerization refers to the average number of repeating units in a polymer chain, and may be calculated from the ratio of number average molecular weight to molecular weight of the repeating unit. For example, a number average degree of polymerization may be 1,300 to 3,000, 1,300 to 2,500, or 1,300 to 2,000, and specifically, may be 1,300 to 1,700.

The average particle diameter, for example, may be different according to a number average degree of polymerization of a vinyl chloride-based polymer. As a specific example, when a number average degree of polymerization of a vinyl chloride-based polymer is 1,300, the average particle diameter may be 140 μm to 200 μm, 140 μm to 160 μm, or 140 μm to 150 μm. As another example, when a number average degree of polymerization of a vinyl chloride-based polymer is 1,700, the average particle diameter may be 100 μm to 140 μm, 120 μm to 140 μm, or 120 μm to 130 μm. In this range, there are effects that the mechanical properties of a vinyl chloride-based polymer having a high degree of polymerization are maintained while the melt processability during processing is remarkably improved.

The particle size distribution, for example, may be different according to a number average degree of polymerization of a vinyl chloride-based polymer. As a specific example, when a number average degree of polymerization of a vinyl chloride-based polymer is 1,300, the particle size distribution may be 2.1 to 2.5, 2.1 to 2.3, or 2.1 to 2.2. As another example, when a number average degree of polymerization of a vinyl chloride-based polymer is 1,700, the particle size distribution may be 1.8 to 2.1, 1.9 to 2.1, or 1.9 to 2.0. When polymerization is performed in this range, the mechanical properties of a vinyl chloride-based polymer having a high degree of polymerization are maintained while the melt processability during processing is remarkably improved.

The average particle diameter and the particle size distribution may be an average particle diameter value and a particle size distribution value which are measured from a size of an angle of light diffracted according to a size of particle when a power as a sample unit passes through a cell by using an optical laser method particle meter.

Hereinafter, the present invention will be explained in more detail referring to specific examples. However, the following examples are only for illustrating the present invention, and the scope of the present invention is not limited thereto.

EXAMPLES

Example 1

0.05 parts by weight of polyvinyl alcohol having a degree of hydration of 88 mol % and 0.02 parts by weight of polyvinyl alcohol having a degree of hydration of 72 mol % were prepared in an agitator. 0.08 parts by weight of diallyl phthalate were then added thereto, mixed and stirred at a speed of 90 rpm for 20 minutes to prepare a mixture in which diallyl phthalate was activated.

To a stainless polymerization reactor having an internal volume of 1 m$^3$ and equipped with a reflux condenser and a stirrer, the mixture, 140 parts by weight of polymerization water, and 0.005 parts by weight of hydroxypropylmethyl cellulose were added. Then, 0.088 parts by weight of t-butyl peroxyneodecanoate was added to the polymerization reactor and the inside thereof was degassed with a vacuum pump while stirring. 100 parts by weight of a vinyl chloride monomer (VCM) was added to the polymerization reactor, and polymerization was performed at a polymerization temperature of 54° C. to achieve a number average degree of polymerization of 1,300. Thereafter, the polymerization was terminated when there was a change of 1.0 kg/of in the pressure of the polymerization reactor. 0.05 parts by weight of triethylene glycol-bis-[3-(3-t-butyl-5-methyl-4-hydroxyphenyl) propionate] as an antioxidant, and 0.05 parts by weight eugenol (4-allyl-2-methoxyphenol) as an additive were added to the reactor. Then, an unreacted monomer was recovered, and polymer slurry was recovered from a polymerization reactor. Thereafter, the obtained polymer slurry was dried using a conventional fluidized bed dryer to finally obtain a vinyl chloride polymer having a number average degree of polymerization of 1,300, an amount of gel of 1.35 wt %, an average particle diameter of 141 μm, and a particle size distribution of 2.1 to 2.2.

The obtained vinyl chloride polymer sample (0.2 g) was dissolved in THF (20 ml) at 50° C. for 24 hours, and then gel was separated using a centrifuge (6,000 rpm, 20 minutes). After being dried 80° C. for 1 hour, the gel was weighed, and then the amount of the gel was calculated by the following formula.

*Gel amount(wt %)=(weight after centrifugation and drying/sample weight)*100

The average particle diameter and the particle size distribution were measured using an optical laser method particle meter from the size of angle of light diffracted according to the size of particle when a power serving as a sample unit passed through a cell. The measured values of the average particle diameter and the particle size distribution were shown in the error range.

Example 2

A vinyl chloride polymer was obtained in the same manner as in Example 1 except that 0.1 parts by weight of diallyl phthalate was added and the polymerization was performed at a polymerization temperature of 56° C. to achieve a number average degree of polymerization of 1,300. Finally, a vinyl chloride polymer having a number average degree of polymerization of 1,300, an amount of gel of 1.37 wt %, an average particle diameter of 141 μm, and a particle size distribution of 2.1 to 2.2 was obtained.

Example 3

A vinyl chloride polymer was obtained in the same manner as in Example 1 except that 0.13 parts by weight of diallyl phthalate was added and the polymerization was performed at a polymerization temperature of 58° C. to achieve a number average degree of polymerization of 1,300. Finally, a vinyl chloride polymer having a number average degree of polymerization of 1,300, an amount of gel of 2.32 wt %, an average particle diameter of 142 μm, and a particle size distribution of 2.1 to 2.2 was obtained.

Example 4

A vinyl chloride polymer was obtained in the same manner as in Example 1 except that 0.04 parts by weight of diallyl phthalate was added and the polymerization was performed at a polymerization temperature of 50° C. to achieve a number average degree of polymerization of 1,700. Finally, a vinyl chloride polymer having a number average degree of polymerization of 1,700, an amount of gel of 1.21 wt %, an average particle diameter of 121 μm, and a particle size distribution of 1.9 to 2.0 was obtained.

Example 5

A vinyl chloride polymer was obtained in the same manner as in Example 1 except that 0.06 parts by weight of diallyl phthalate was added and the polymerization was performed at a polymerization temperature of 51° C. to achieve a number average degree of polymerization of 1,300. Finally, a vinyl chloride polymer having a number average degree of polymerization of 1,700, an amount of gel of 1.26 wt %, an average particle diameter of 121 μm, and a particle size distribution of 1.9 to 2.0 was obtained.

Example 6

A vinyl chloride polymer was obtained in the same manner as in Example 1 except that 0.1 parts by weight of diallyl phthalate was added and the polymerization was performed at a polymerization temperature of 53° C. to achieve a number average degree of polymerization of 1,700. Finally, a vinyl chloride polymer having a number average degree of polymerization of 1,700, an amount of gel of 1.32 wt %, an average particle diameter of 122 μm, and a particle size distribution of 1.9 to 2.0 was obtained.

Example 7

A vinyl chloride polymer was obtained in the same manner as in Example 1 except that 0.2 parts by weight of diallyl phthalate was added and the polymerization was performed at a polymerization temperature of 55° C. to achieve a number average degree of polymerization of 1,700. Finally, a vinyl chloride polymer having a number average degree of polymerization of 1,700, an amount of gel of 4.78 wt %, an average particle diameter of 122 μm, and a particle size distribution of 1.9 to 2.0 was obtained.

Example 8

A vinyl chloride polymer was obtained in the same manner as in Example 1 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed and stirred at a speed of 70 rpm for 10 minutes to prepare a mixture in which diallyl phthalate was activated; and the polymerization was performed at a polymerization temperature of 56° C. to achieve a number average degree of polymerization of 1,300. Finally, a vinyl chloride polymer having a number average degree of polymerization of 1,300, an amount of gel of 1.37 wt %, an average particle diameter of 146 μm, and a particle size distribution of 2.1 to 2.2 was obtained.

Example 9

A vinyl chloride polymer was obtained in the same manner as in Example 1 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed and stirred at a speed of 70 rpm for 40 minutes to prepare a mixture in which diallyl phthalate was activated; and the polymerization was performed at a polymerization temperature of 56° C. to achieve a number average degree of polymerization of 1,300. Finally, a vinyl chloride polymer having a number average degree of polymerization of 1,300, an amount of gel of 1.37 wt %, an average particle diameter of 145 μm, and a particle size distribution of 2.1 to 2.2 was obtained.

Example 10

A vinyl chloride polymer was obtained in the same manner as in Example 1 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed and stirred at a speed of 100 rpm for 10 minutes to prepare a mixture in which diallyl phthalate was activated; and the polymerization was performed at a polymerization temperature of 56° C. to achieve a number average degree of polymerization of 1,300. Finally, a vinyl chloride polymer having a number average degree of polymerization of 1,300, an amount of gel of 1.37 wt %, an average particle diameter of 142 μm, and a particle size distribution of 2.1 to 2.2 was obtained.

Example 11

A vinyl chloride polymer was obtained in the same manner as in Example 1 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed and stirred at a speed of 100 rpm for 40 minutes to prepare a mixture in which diallyl phthalate was activated; and the polymerization was performed at a polymerization temperature of 56° C. to achieve a number average degree of polymerization of 1,300. Finally, a vinyl chloride polymer having a number average degree of polymerization of 1,300, an amount of gel of 1.37 wt %, an average particle diameter of 141 μm, and a particle size distribution of 2.1 to 2.2 was obtained.

Comparative Example 1

A vinyl chloride polymer was obtained in the same manner as in Example 1 except that diallyl phthalate was not added and the polymerization was performed at a polymerization temperature of 52° C. to achieve a number average degree of polymerization of 1,300. Finally, a vinyl chloride polymer having a number average degree of polymerization of 1,300, an amount of gel of 1.18 wt %, an average particle diameter of 150 μm, and a particle size distribution of 2.1 to 2.2 was obtained.

Comparative Example 2

A vinyl chloride polymer was obtained in the same manner as in Example 1 except that diallyl phthalate was not added and the polymerization was performed at a polymerization temperature of 47.5° C. to achieve a number average degree of polymerization of 1,700. Finally, a vinyl chloride polymer having a number average degree of polymerization of 1,700, an amount of gel of 1.06 wt %, an average particle diameter of 130 μm, and a particle size distribution of 1.9 to 2.0 was obtained.

Comparative Example 3

A vinyl chloride polymer was obtained in the same manner as in Example 1 except that instead of a mixture in which diallyl phthalate was activated, 0.05 parts by weight of polyvinyl alcohol having a degree of hydration of 88 mol %, 0.02 parts by weight of polyvinyl alcohol having a degree of hydration of 72 mol %, and 0.008 parts by weight of diallyl phthalate were respectively added to the stainless polymerization reactor having an internal volume of 1 m³ and equipped with a reflux condenser and a stirrer. Finally, a vinyl chloride polymer having a number average degree of polymerization of 1,280, an amount of gel of 1.38 wt %, an average particle diameter of 141 μm, and a particle size distribution of 2.1 to 2.2 was obtained.

Comparative Example 4

A vinyl chloride polymer was obtained in the same manner as in Example 4 except that instead of a mixture in which diallyl phthalate was activated, 0.05 parts by weight of polyvinyl alcohol having a degree of hydration of 88 mol %, 0.02 parts by weight of polyvinyl alcohol having a degree of hydration of 72 mol %, and 0.04 parts by weight of diallyl phthalate were respectively added to the stainless polymerization reactor having an internal volume of 1 m³ and equipped with a reflux condenser and a stirrer. Finally, a vinyl chloride polymer having a number average degree of polymerization of 1,680, an amount of gel of 1.22 wt %, an average particle diameter of 121 μm, and a particle size distribution of 1.9 to 2.0 was obtained.

Comparative Example 5

A vinyl chloride polymer was obtained in the same manner as in Example 8 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed, and stirred at a speed of 70 rpm for 5 minutes to prepare a mixture in which diallyl phthalate was activated. Finally, a vinyl chloride polymer having a number average degree of polymerization of 1,260, an amount of gel of 1.37 wt %, an average particle diameter of 148 μm, and a particle size distribution of 2.1 to 2.2 was obtained.

Comparative Example 6

A vinyl chloride polymer was obtained in the same manner as in Example 8 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed, and stirred at a speed of 70 rpm for 50 minutes to prepare a mixture in which diallyl phthalate was activated. Finally, a vinyl chloride polymer having a number average degree of polymerization of 1,290, an amount of gel of 1.37 wt %, an average particle diameter of 145 μm, and a particle size distribution of 2.1 to 2.2 was obtained.

Comparative Example 7

A vinyl chloride polymer was obtained in the same manner as in Example 8 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed, and stirred at a speed of 100 rpm for 5 minutes to prepare a mixture in which diallyl phthalate was activated. Finally, a vinyl chloride polymer having a number average degree of polymerization of 1,280, an amount of gel of 1.37 wt %, an average particle diameter of 144 μm, and a particle size distribution of 2.1 to 2.2 was obtained.

Comparative Example 8

A vinyl chloride polymer was obtained in the same manner as in Example 8 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed, and stirred at a speed of 100 rpm for 50 minutes to prepare a mixture in which diallyl phthalate was activated. Finally, a vinyl chloride polymer having a number average degree of polymerization of 1,290, an amount of gel of 1.37 wt %, an average particle diameter of 141 μm, and a particle size distribution of 2.1 to 2.2 was obtained.

Comparative Example 9

A vinyl chloride polymer was obtained in the same manner as in Example 8 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed, and stirred at a speed of 60 rpm for 10 minutes to prepare a mixture in which diallyl phthalate was activated. Finally, a vinyl chloride polymer having a number average degree of polymerization of 1,250, an amount of gel of 1.37 wt %, an average particle diameter of 150 μm, and a particle size distribution of 2.1 to 2.2 was obtained.

Comparative Example 10

A vinyl chloride polymer was obtained in the same manner as in Example 8 except that 0.05 parts by weight of polyvinyl alcohol having a degree of hydration of 88 mol % and 0.02 parts by weight of polyvinyl alcohol having a degree of hydration of 72 mol % were prepared in an agitator; 0.1 parts by weight of diallyl phthalate were added thereto, mixed, and stirred at a speed of 110 rpm for 10 minutes to prepare a mixture in which diallyl phthalate was activated. Finally, a vinyl chloride polymer having a number average degree of polymerization of 1,290, an amount of gel of 1.37 wt %, an average particle diameter of 142 μm, and a particle size distribution of 2.1 to 2.2 was obtained.

Experimental Example

In order to compare and analyze the melt processability of the vinyl chloride-based polymers prepared in Examples 1 to 11 and Comparative Examples 1 to 10, 100 parts by weight of the prepared vinyl chloride-based polymer, 35 parts by weight of plasticizer, 2 parts by weight of organotin-based stabilizer, and 1 part by weight of lubricant were uniformly mixed and then processed at 140° C. and 30 rpm using brabender plastograph by Brabender Gmbh & Co KG. Melting time, melting load, plasticizer absorption rate, and apparent specific gravity of the processed vinyl chloride-based polymers were measured and the results are shown in Table 1 below.

1) Meting Time (Seconds) and Melting Load (Nm)

Melting time and melting load were determined by respectively checking melting time and melting load when processing using the brabender. Here, melting time represents the time taken until each of the vinyl chloride-based polymer and the plasticizer are mixed with each other and completely melted. Melting load represents the torque when the vinyl chloride-based polymer and the plasticizer are completely melted.

2) Plasticizer Absorption Rate (CPA, wt %)

A hole at the lower part of a glass tube was blocked with cotton and 1 g of the processed vinyl chloride-based polymer was weighed and then placed into the tube. Then, 2 g of dioctyl phthalate (DOP) was added thereto. Thereafter, the tube was mounted on a centrifuge and centrifuged at 4,800 rpm for 30 minutes. By calculating the weight of the polymer increased, a plasticizer absorption rate was determined and then expressed as a percentage.

3) Apparent Specific Gravity (B.D)

A funnel was filled up with a measurement sample and then the upper part of the funnel was hit with a rod such that the sample would not touch the wall of the funnel. Then, the lower part of the funnel and a measuring cup were aligned with the center, and then a button of the funnel was opened to allow the measurement sample to freely fall into the measuring cup. When the measurement sample filled up the measuring cup, the top surface of the measurement sample was flattened with a rod, and apparent specific gravity was calculated by weighing the measurement sample contained in the measuring up.

TABLE 1

| Category | | Stirring conditions Speed (rpm) | Stirring conditions Time (minutes) | Chain regulator addition amount (parts by weight) | Polymerization temperature (° C.) | Number average degree of polymerization | Melting time (seconds) | Melting load (Nm) | Plasticizer absorption rate (wt %) | Apparent specific gravity (g/cc) |
|---|---|---|---|---|---|---|---|---|---|---|
| Examples | 1 | 90 | 20 | 0.08 | 54 | 1300 | 132 | 30.0 | 26.3 | 0.540 |
| | 2 | 90 | 20 | 0.1 | 56 | 1300 | 105 | 29.2 | 26.2 | 0.547 |
| | 3 | 90 | 20 | 0.13 | 58 | 1300 | 94 | 28.6 | 26.0 | 0.548 |

TABLE 1-continued

| Category | | Stirring conditions Speed (rpm) | Stirring conditions Time (minutes) | Chain regulator addition amount (parts by weight) | Polymerization temperature (° C.) | Number average degree of polymerization | Melting time (seconds) | Melting load (Nm) | Plasticizer absorption rate (wt %) | Apparent specific gravity (g/cc) |
|---|---|---|---|---|---|---|---|---|---|---|
| | 4 | 90 | 20 | 0.04 | 50 | 1700 | 404 | 28.4 | 30.1 | 0.490 |
| | 5 | 90 | 20 | 0.06 | 51 | 1700 | 380 | 28.1 | 30.0 | 0.492 |
| | 6 | 90 | 20 | 0.1 | 53 | 1700 | 288 | 27.5 | 29.7 | 0.497 |
| | 7 | 90 | 20 | 0.2 | 55 | 1700 | 208 | 27.2 | 29.5 | 0.501 |
| | 8 | 70 | 10 | 0.1 | 56 | 1300 | 131 | 29.7 | 25.9 | 0.535 |
| | 9 | 70 | 40 | 0.1 | 56 | 1300 | 126 | 29.6 | 26.1 | 0.540 |
| | 10 | 100 | 10 | 0.1 | 56 | 1300 | 124 | 29.4 | 26.2 | 0.538 |
| | 11 | 100 | 40 | 0.1 | 56 | 1300 | 124 | 29.3 | 26.2 | 0.537 |
| Comparative Examples | 1 | — | — | — | 52 | 1300 | 168 | 30.8 | 27.0 | 0.518 |
| | 2 | — | — | — | 47.5 | 1700 | 484 | 29.4 | 30.7 | 0.480 |
| | 3 | — | — | 0.08 | 54 | 1280 | 145 | 30.1 | 26.5 | 0.525 |
| | 4 | — | — | 0.04 | 50 | 1680 | 409 | 29.0 | 30.0 | 0.486 |
| | 5 | 70 | 5 | 0.1 | 56 | 1260 | 158 | 30.6 | 26.7 | 0.520 |
| | 6 | 70 | 50 | 0.1 | 56 | 1290 | 127 | 29.6 | 26.1 | 0.540 |
| | 7 | 100 | 5 | 0.1 | 56 | 1280 | 147 | 30.3 | 26.6 | 0.524 |
| | 8 | 100 | 50 | 0.1 | 56 | 1290 | 124 | 29.1 | 26.3 | 0.537 |
| | 9 | 60 | 10 | 0.1 | 56 | 1250 | 160 | 30.6 | 26.7 | 0.520 |
| | 10 | 110 | 10 | 0.1 | 56 | 1290 | 128 | 29.0 | 26.6 | 0.536 |

In Table 1, the lower the numerical values of melting time, melting load, plasticizer absorption rate, and the higher the numerical value of apparent specific gravity is, the properties are excellent. Also, it usually shows a big difference in properties of meting time and melting load according to a number average degree of polymerization. It is known that a polymer having a high number average degree of polymerization relatively has an increase in melting time and melting load when compared with a polymer having a low number average degree of polymerization. Accordingly, when a polymer having a high number average degree of polymerization exhibits a reduced melting time and melting load when compared with a polymer having a relatively low number average degree of polymerization, there is a larger difference than a difference shown in a simple numerical value.

As shown in Table 1, in the cases of Examples 1 to 11, the vinyl chloride-based polymers prepared by the preparation method according to the present invention were confirmed to have decreased plasticizer absorption rates, increased apparent specific gravity, and excellent melt processability when compared with those of vinyl chloride-based polymers of Comparative Examples 1 to 10.

Evaluation of the Effects of Using Chain Regulator

In particular, in the cases of Examples 1 to 3 and Examples 8 to 11, when compared with Comparative Example 1 in which the number average degree of polymerization and the average particle diameter were identical to those of Examples 1 to 3 but a chain regulator was not added, the plasticizer absorption rate was decreased and the apparent specific gravity was increased. In the cases of Examples 4 to 7, when compared with Comparative Example 2 in which the number average degree of polymerization and the average particle diameter were identical to those of Examples 4 to 7 but a chain regulator was not added, the plasticizer absorption rate was decreased and the apparent specific gravity was increased. From this, it was predicted that the inside of a polymer particle would be filled, and therefore, the melting time and the melting load would be increased. However, unlike the prediction, it was confirmed that in all Examples 1 to 11, the melting time and the melting load were all improved when compared with those of Comparative Examples 1 to 2.

The results show that a polymer particle including a side chain, not a polymer particle comprised only of a parallel chain, was prepared due to the addition of a chain regulator, and a relatively larger friction occurs among these particles when compared with a polymer particle comprised only of a parallel chain. As a result, small particles were first melted allowing big particles to melt fast, thereby improving melt processability.

Evaluation of the Effects According to the Presence or Absence of Stirring Process In addition, in the cases of Comparative Example 3 and 4, a target number average degree of polymerization was not achieved, and therefore, the productivity was not good. Moreover, in the cases of Comparative Examples 3 and 4, when respectively compared with Examples 1 and 4, the plasticizer absorption rate was increased, the apparent specific gravity was decreased, and the melting time and the melting load were increased despite of the low number degree of polymerization. From this, it was confirmed that in Comparative Examples 3 and 4, the melt processability was remarkably decreased when compared with that of Examples 1 and 4. In the meantime, vinyl chloride-based polymers in Comparative Examples 3 and 4 were prepared under the same conditions as in Examples 1 and 4 except that the chain regulator and the first protective colloid auxiliary agent were not stirred in advance before the polymerization and added as a mixture, but were added separately to be used in the polymerization.

Evaluation of Effects of Controlling Stirring Speed and Stirring Time

Meanwhile, in the cases of Comparative Examples 5 to 10, a target number average degree of polymerization was not achieved despite the fact that the chain regulator and the first protective colloid auxiliary agent were stirred in advance to be used as a mixture in the polymerization. Moreover, the plasticizer absorption rate, the apparent specific gravity, the meting time and the melting load properties thereof were not good when compared to those of Examples 8 to 11. Here, vinyl chloride-base polymers in Comparative Examples 5 and 10 were prepared under the same conditions as in Examples 8 and 11 except that while the chain regulator and the first protective colloid auxiliary agent were stirred in advance to be used as a mixture, the mixture was prepared out of the conditions of the stirring speed and the stirring time suggested in the present invention.

Specifically, in the cases of Comparative Examples 5 and 9, and Comparative Examples 7 and 10, when respectively compared with those of Examples 8 and 10, the plasticizer absorption rate was increased, the apparent specific gravity was decreased, and the melting time was greatly increased to 121%, 122%, 118%, and 103%, respectively despite the low number average degree of polymerization.

On the other hand, in the cases of Comparative Examples 6 and 8, the melting time, the melting load, the plasticizer absorption rate, and the apparent specific gravity indicated a similar level when compared with those of Examples 9 and 11. However, in the cases of Comparative Examples 6 and 8, the melting time and the melting load were increased when compared with those of Examples 9 and 11 considering the number average degrees of polymerization were lower than those of Examples 9 and 11.

The results show that the dispersion degree of the chain regulator in the first protective colloid auxiliary agent not only affects a number average degree of polymerization and productivity of polymer, but also affects melt processability. From this, it is possible to confirm that the preparation method according to the present invention is capable of preparing a vinyl chloride-based polymer having improved melt processability while not adversely affecting productivity by stirring a chain regulator with a first protective colloid auxiliary agent in advance to be used in polymerization.

In addition, it is possible to confirm that stirring conditions (stirring speed and stirring time) during the stirring are important factors for improving melt processability of a polymer while maintaining excellent productivity thereof.

Specifically, the results show that when stirring speed is not sufficient (less than 70 rpm), a chain regulator may not be dispersed evenly, and that when stirring speed is excessively high (greater than 100 rpm), it may act as a factor for allowing a chain reactor particle to be extremely pulverized and foam to be generated during stirring, thereby preventing a chain regulator from being dispersed.

The results also show that when stirring time is not sufficient (less than 10 minutes), a chain regulator may not be properly dispersed, however, when stirring time exceeds 40 minutes, an increase of a targeted effect is small, but rather productivity may be reduced due to an increase in time.

The invention claimed is:

1. A method of preparing a vinyl chloride-based polymer, the method comprising the steps of:
   (S1) preparing a mixture in which a first protective colloid auxiliary agent and a chain regulator are mixed;
   (S2) preparing a second protective colloid auxiliary agent including the chain regulator activated by stirring the mixture prepared in step (S1); and
   (S3) performing polymerization by adding a vinyl chloride-based monomer and a polymerization initiator to the second protective colloid auxiliary agent prepared in step (S2),
   wherein the first protective colloid auxiliary agent comprises polyvinyl alcohol,
   wherein the degree of hydration of the polyvinyl alcohol is 60 mol % to 90 mol %,
   wherein the polyvinyl alcohol is a mixture of two or more selected from the group consisting of polyvinyl alcohol having different degrees of hydration, and
   wherein the stirring in step (S2) is performed at a stirring speed of 70 rpm to 100 rpm for 10 to 40 minutes.

2. The method of claim 1, wherein the number average degree of polymerization of the polyvinyl alcohol is 1,000 to 3,500.

3. The method of claim 1, wherein an amount of the first protective colloid auxiliary agent is 0.01 parts by weight to 1 part by weight based on 100 parts by weight of the vinyl chloride-based monomer.

4. The method of claim 1, wherein the chain regulator is one or more selected from the group consisting of diallyl phthalate, allyl methacrylate, and pentaerythritol triallyl ether.

5. The method of claim 1, wherein an amount of the chain regulator is 0.01 parts by weight to 0.5 parts by weight based on 100 parts by weight of the vinyl chloride-based monomer.

6. The method of claim 1, wherein the stirring in step (S2) is performed at a stirring speed of 90 rpm to 100 rpm for 10 to 20 minutes.

7. The method of claim 1, wherein the polymerization in step (S3) is performed by additionally including a third protective colloid auxiliary agent.

8. The method of claim 7, wherein the third protective colloid auxiliary agent is a water-soluble cellulose-based compound.

9. The method of claim 1, wherein the polymerization in step (S3) is performed at a temperature of 48° C. to 62° C.

* * * * *